(12) United States Patent
Minoo et al.

(10) Patent No.: US 12,096,014 B2
(45) Date of Patent: *Sep. 17, 2024

(54) ADAPTIVE PERCEPTUAL MAPPING AND SIGNALING FOR VIDEO CODING

(71) Applicant: ARRIS Enterprises LLC, Suwanee, GA (US)

(72) Inventors: Koohyar Minoo, San Diego, CA (US); Zhouye Gu, San Jose, CA (US); David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,700

(22) Filed: Aug. 18, 2023

(65) Prior Publication Data

US 2024/0048739 A1 Feb. 8, 2024

Related U.S. Application Data

(63) Continuation of application No. 17/747,337, filed on May 18, 2022, now abandoned, which is a (Continued)

(51) Int. Cl.
*H04N 19/40* (2014.01)
*H04N 19/124* (2014.01)
(Continued)

(52) U.S. Cl.
CPC .......... *H04N 19/40* (2014.11); *H04N 19/124* (2014.11); *H04N 19/126* (2014.11);
(Continued)

(58) Field of Classification Search
None
See application file for complete search history.

(56) References Cited

U.S. PATENT DOCUMENTS

| 8,054,886 B2 | 11/2011 | Srinivasan et al. |
| 8,934,020 B2 | 1/2015 | Wang et al. |

(Continued)

FOREIGN PATENT DOCUMENTS

| WO | 2013086169 A1 | 6/2013 |
| WO | 2014130343 A2 | 8/2014 |

(Continued)

OTHER PUBLICATIONS

PCT Invitation to Pay Additional Fees (Form ISA/206), dated Jul. 11, 2016.
(Continued)

*Primary Examiner* — David N Werner
(74) *Attorney, Agent, or Firm* — Chernoff, Vilhauer, McClung & Stenzel, LLP

(57) ABSTRACT

A method is provided for encoding a digital video to improve perceptual quality. The method includes receiving a digital video at a video encoder, providing a perceptual quantizer function defined by $$PQ(L) = \left(\frac{c_1 + c_2 L^{m_1}}{1 + c_3 L^{m_1}}\right)^{m_2},$$

wherein L is a luminance value, $c_1$, $c_2$, $c_3$, and $m_1$ are parameters with fixed values, and $m_2$ is a parameter with a variable value, adapting the perceptual quantizer function by adjusting the value of the $m_2$ parameter based on different luminance value ranges found within a coding level of the digital video, encoding the digital video into a bitstream using, in part, the perceptual quantizer function, transmitting the bitstream to a decoder, and transmitting the value of the $m_2$ parameter to the decoder for each luminance value range in the coding level.

17 Claims, 8 Drawing Sheets

Related U.S. Application Data continuation of application No. 16/909,698, filed on Jun. 23, 2020, now Pat. No. 11,368,701, which is a continuation of application No. 15/394,721, filed on Dec. 29, 2016, now Pat. No. 10,735,756, which is a continuation of application No. 15/135,497, filed on Apr. 21, 2016, now Pat. No. 10,735,755.

(60) Provisional application No. 62/150,457, filed on Apr. 21, 2015.

(51) Int. Cl.

| | | |
|---|---|---|
| *H04N 19/126* | (2014.01) | |
| *H04N 19/132* | (2014.01) | |
| *H04N 19/136* | (2014.01) | |
| *H04N 19/154* | (2014.01) | |
| *H04N 19/172* | (2014.01) | |
| *H04N 19/176* | (2014.01) | |
| *H04N 19/184* | (2014.01) | |
| *H04N 19/186* | (2014.01) | |
| *H04N 19/44* | (2014.01) | |
| *H04N 19/70* | (2014.01) | |
| *H04N 19/98* | (2014.01) | |

(52) U.S. Cl.
CPC ......... *H04N 19/132* (2014.11); *H04N 19/136* (2014.11); *H04N 19/154* (2014.11); *H04N 19/172* (2014.11); *H04N 19/176* (2014.11); *H04N 19/184* (2014.11); *H04N 19/186* (2014.11); *H04N 19/44* (2014.11); *H04N 19/70* (2014.11); *H04N 19/98* (2014.11)

(56) References Cited

U.S. PATENT DOCUMENTS

| 11,368,701 B2* | 6/2022 | Minoo | ................ H04N 19/126 |
|---|---|---|---|
| 2002/0094127 A1 | 7/2002 | Mitchell et al. | |
| 2002/0186888 A1 | 12/2002 | Kondo et al. | |
| 2003/0031372 A1 | 2/2003 | Youn | |
| 2003/0152165 A1 | 8/2003 | Kondo et al. | |
| 2011/0280302 A1 | 11/2011 | Alshina et al. | |
| 2012/0314026 A1 | 12/2012 | Chen et al. | |
| 2013/0034157 A1 | 2/2013 | Helle et al. | |
| 2013/0083163 A1 | 4/2013 | Kwon et al. | |
| 2013/0223531 A1 | 8/2013 | Garbas et al. | |
| 2014/0363093 A1 | 12/2014 | Miller et al. | |
| 2015/0245039 A1 | 8/2015 | Kondo | |
| 2015/0245050 A1 | 8/2015 | Tourapis et al. | |
| 2015/0341611 A1 | 11/2015 | Oh et al. | |
| 2016/0044277 A1 | 2/2016 | Oh et al. | |
| 2016/0134870 A1 | 5/2016 | Lu et al. | |
| 2016/0142714 A1 | 5/2016 | Toma et al. | |
| 2016/0150180 A1 | 5/2016 | Kozuka et al. | |
| 2016/0173811 A1 | 6/2016 | Oh et al. | |
| 2016/0205338 A1 | 7/2016 | Kozuka et al. | |
| 2016/0234521 A1 | 8/2016 | Goel | |
| 2016/0301959 A1 | 10/2016 | Oh et al. | |
| 2016/0316207 A1 | 10/2016 | Minoo et al. | |
| 2016/0330513 A1 | 11/2016 | Toma et al. | |
| 2016/0366449 A1 | 12/2016 | Stessen et al. | |
| 2017/0026627 A1 | 1/2017 | Toma et al. | |
| 2017/0142499 A1 | 5/2017 | Oh et al. | |
| 2017/0155966 A1 | 6/2017 | Oh et al. | |
| 2017/0171576 A1 | 6/2017 | Oh et al. | |
| 2017/0264859 A1 | 9/2017 | Drugeon et al. | |
| 2017/0374313 A1 | 12/2017 | Oh et al. | |
| 2017/0374363 A1 | 12/2017 | Deng | |
| 2018/0007363 A1 | 1/2018 | Oh et al. | |
| 2021/0021874 A1* | 1/2021 | Zheng | ................ H04N 19/40 |

FOREIGN PATENT DOCUMENTS

| WO | 2014160705 A1 | 10/2014 |
|---|---|---|
| WO | 2016140954 A1 | 9/2016 |

OTHER PUBLICATIONS

R. Mantiuk, et al., "Evaluation of high dynamic range color pixel encoding", 110th MPEG Meeting (Motion Picture Expert Group or ISO/IEC JTC1/SC29/WG11) No. m34649, Oct. 17, 2014, 6 pgs.

PCT International Search Report & Written Opinion, RE: Application No. PCT/US2016/028721, dated Sep. 2, 2016.

S. Miller, et al., "Perceptual Signal Coding for More Efficient Usage of Bit-Codes", SMPTE Motion Imaging Journal 122(4), 52-59 (2013).

S. Miller, "A Perceptual EOTF for Extended Dynamic Range Imagery", SMPTE (2014).

Ryan Juckett, "RGB Color Space Conversion", ryanjuckett.com, May 16, 2010 (Year: 2010).

T. Kunkel, G. Ward, B. Lee, & S. Daly, "HDR and Wide Gamut Appearance-based Color Encoding and its Quantification", 2013 Picture Coding Symposium (PCS) (Dec. 8, 2013) (Year: 2013).

B.G. Haskell & A. Puri, "MPEG Video Compression Basics", in _ The MPEG Representation of Digital Media_ (L. Chiariglione ed., 2012) (2012) (Year:2012).

EP Summons to Attend Oral Proceedings Pursuant to Rule 115(1) Re: Application No. 16720278.7, dated Feb. 5, 2021.

SMPTE Standard No. 2084, "High Dynamic Electro-Optical Transfer Function of Mastering Reference Displays" (Aug. 14, 2014) (Year: 2014).

* cited by examiner

ADAPTIVE PERCEPTUAL MAPPING AND SIGNALING FOR VIDEO CODING

CLAIM OF PRIORITY

This Application is a Continuation of U.S. patent application Ser. No. 17/747,337, filed May 18, 2022, which is a Continuation of U.S. patent application Ser. No. 16/909,698, filed Jun. 23, 2020, now U.S. Pat. No. 11,368,701, which is a Continuation of U.S. patent application Ser. No. 15/394,721, filed Dec. 29, 2016, now U.S. Pat. No. 10,735,756, which is a Continuation of U.S. patent application Ser. No. 15/135,497 filed on Apr. 21, 2016, now U.S. Pat. No. 10,735,755, which claims priority to United States Provisional Application Serial No. 62/150,457, filed Apr. 21, 2015, all of which are hereby incorporated by reference.

TECHNICAL FIELD

The present disclosure relates to the field of video encoding and decoding, particularly a method of adaptively transforming linear input values into non-linear values that can be quantized, based on content characteristics of an input video.

BACKGROUND

High Dynamic Range (HDR) video and Wide Color Gamut (WCG) video offer greater ranges of luminance and color values than traditional video. For example, traditional video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

However, many common video encoding and decoding schemes, such as MPEG-4 Advanced Video Coding (AVC) and High Efficiency Video Coding (HEVC), are not designed to directly handle HDR or WCG video. As such, HDR and WCG video information normally must be converted into other formats before it can be encoded using a video compression algorithm.

For example, HDR video formats such as the EXR file format describe colors in the RGB color space with 16-bit values to cover a broad range of potential HDR values, while 8 or 10-bit values are often used to express the colors of non-HDR video. Since many video compression algorithms expect 8 or 10-bit values, 16-bit HDR color values can be quantized into 10-bit values that the compression algorithms can work with.

Some encoders use a coding transfer function to convert linear values from the input video into non-linear values prior to uniform quantization. By way of a non-limiting example, coding transfer functions are often gamma correction functions. However, even when an encoder uses a coding transfer function to convert linear input values into non-linear values, the coding transfer function is generally fixed, such that it does not change dependent on the content of the input video. For example, an encoder's coding transfer function can be defined to statically map every possible input value in an HDR range, such as from 0 to 10,000 nits, to specific non-linear values. However, when the input video contains input values in only a portion of that range, fixed mapping can lead to poor allocation of quantization levels. For example, a picture primarily showing a blue sky can have a lot of similar shades of blue, but those blues can occupy a small section of the overall range for which the coding transfer function is defined. As such, similar blues can be quantized into the same value. This quantization can often be perceived by viewers as contouring or banding, when quantized shades of blue extends in bands across the sky displayed on their screen instead of a more natural transitions between the colors.

Additionally, psychophysical studies of the human visual system have shown that a viewer's sensitivity to contrast levels at a particular location can be more dependent on the average brightness of surrounding locations than the actual levels at the location itself. However, most coding transfer functions do not take this into account and instead have fixed conversion functions or tables that do not take characteristics of the actual content, such as its average brightness, into account.

What is needed is a method of adapting the coding transfer function, or otherwise converting and/or redistributing input values, based on the actual content of the input video. This can generate a curve of non-linear values that represents the color and/or intensity information actually present in the input video instead of across a full range of potential values. As such, when the non-linear values are uniformly quantized, the noise and/or distortion introduced by uniform quantization can be minimized such that it is unlikely to be perceived by a human viewer. Additionally, what is needed is a method of transmitting information about the perceptual mapping operations used by the encoder to decoders, such that the decoders can perform corresponding reverse perceptual mapping operations when decoding the video.

SUMMARY

The present disclosure provides a method of encoding a digital video, the method comprising receiving a digital video at a video encoder, providing a perceptual quantizer function at the video encoder, the perceptual quantizer function defined by $$PQ(L) = \left(\frac{c_1 + c_2 L^{m_1}}{1 + c_3 L^{m_1}}\right)^{m_2},$$

wherein L is a luminance value, $c_1$, $c_2$, $c_3$, and $m_1$ are parameters with fixed values, and $m_2$ is a parameter with a variable value, adapting the perceptual quantizer function at the video encoder by adjusting the value of the $m_2$ parameter based on different luminance value ranges found within a coding level of the digital video, encoding the digital video into a bitstream with the video encoder using, in part, the perceptual quantizer function, transmitting the bitstream to a decoder, and transmitting the value of the $m_2$ parameter to the decoder for each luminance value range in the coding level.

The present disclosure also provides a method of decoding a digital video, the method comprising receiving a bitstream at a video decoder, providing a perceptual quantizer function at the video decoder, the perceptual quantizer function defined by $$PQ(L) = \left(\frac{c_1 + c_2 L^{m_1}}{1 + c_3 L^{m_1}}\right)^{m_2},$$

wherein L is a luminance value, $c_1$, $c_2$, $c_3$, and $m_1$ are parameters with fixed values, and $m_2$ is a parameter with a variable value, receiving a particular value for the $m_2$ parameter for each luminance value range in a coding level, and decoding the digital video with the video decoder using, in part, the perceptual quantizer function with the received value of the $m_2$ parameter.

The present disclosure also provides a video encoder comprising a data transmission interface configured to receive a digital video comprising linear color values, and a processor configured to analyze the linear color values within a coding level to determine a range of color values present within the coding level, adapt a perceptual mapping operation based the range of color values present within the coding level, perform the perceptual mapping operation to convert the linear color values into non-linear color values, uniformly quantize the non-linear color values and encode them into a coded bitstream, wherein the data transmission interface is further configured to transmit the coded bitstream to a decoder, and transmit one or more parameters to the decoder from which the decoder can derive a reverse perceptual mapping operation that substantially reverses the perceptual mapping operation for the coding level.

The present disclosure also provides a video decoder comprising a data transmission interface configured to receive a coded bitstream and one or more parameters associated with a coding level, and a processor configured to decode the coded bitstream into non-linear values, derive a reverse perceptual mapping operation for the coding level from the one or more parameters, and perform the reverse perceptual mapping operating for the coding level to convert the non-linear values to linear values to reconstruct a digital video.

BRIEF DESCRIPTION OF THE DRAWINGS

Further details of the present invention are explained with the help of the attached drawings in which.

DETAILED DESCRIPTION

Figure 1:
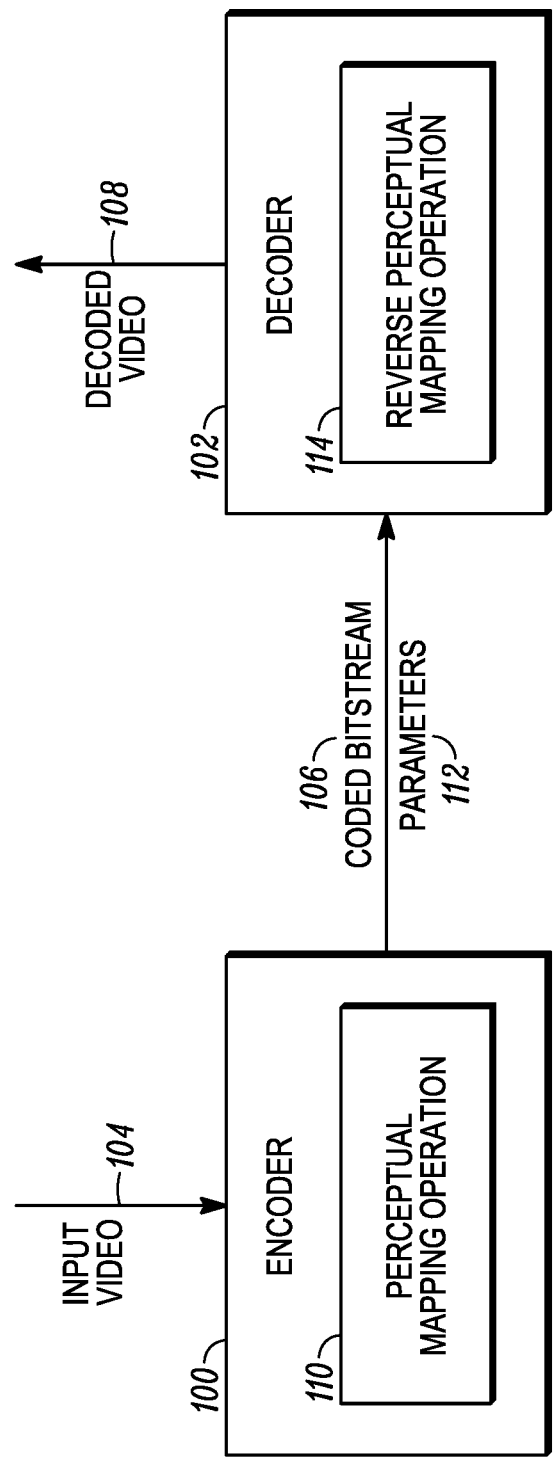
FIG. 1 depicts an embodiment of a video coding system comprising an encoder and a decoder.

FIG. 1 depicts an embodiment of a video coding system comprising an encoder 100 and a decoder 102. An encoder 100 can comprise processors, memory, circuits, and/or other hardware and software elements configured to encode, transcode, and/or compress input video 104 into a coded bitstream 106. The encoder 100 can be configured to generate the coded bitstream 106 according to a video coding format and/or compression scheme, such as HEVC (High Efficiency Video Coding), H.264/MPEG-4 AVC (Advanced Video Coding), or MPEG-2. By way of a non-limiting example, in some embodiments the encoder 100 can be a Main 10 HEVC encoder.

The encoder 100 can receive an input video 104 from a source, such as over a network or via local data storage from a broadcaster, content provider, or any other source. The encoder 100 can encode the input video 104 into the coded bitstream 106. The coded bitstream 106 can be transmitted to decoders 102 over the internet, over a digital cable television connection such as Quadrature Amplitude Modulation (QAM), or over any other digital transmission mechanism.

A decoder 102 can comprise processors, memory, circuits, and/or other hardware and software elements configured to decode, transcode, and/or decompress a coded bitstream 106 into decoded video 108. The decoder 102 can be configured to decode the coded bitstream 106 according to a video coding format and/or compression scheme, such as HEVC, H.264/MPEG-4 AVC, or MPEG-2. By way of a non-limiting example, in some embodiments the decoder 102 can be a Main 10 HEVC decoder. The decoded video 108 can be output to a display device for playback, such as playback on a television, monitor, or other display.

In some embodiments, the encoder 100 and/or decoder 102 can be a dedicated hardware devices. In other embodiments the encoder 100 and/or decoder 102 can be, or use, software programs running on other hardware such as servers, computers, or video processing devices. By way of a non-limiting example, an encoder 100 can be a video encoder operated by a video service provider, while the decoder 102 can be part of a set top box connected to a television, such as a cable box.

The input video 104 can comprise a sequence of pictures, also referred to as frames. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel. By way of another non-limiting example, many video coding formats and/or compression schemes use a Y'CbCr color space when encoding and decoding video. In the Y'CbCr color space, Y' is a luma component while Cb and Cr are chroma components that indicate blue-difference and red-difference components.

In some embodiments or situations, the input video 104 can be an HDR input video 104. An HDR input video 104 can have one or more sequences with luminance and/or color values described in a high dynamic range (HDR) and/or on a wide color gamut (WCG). By way of a non-limiting example, a video with a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video 104 can have a broader range of luminance and/or chroma values than standard or non-HDR videos.

In some embodiments, the HDR input video 104 can have its colors indicated with RGB values in a high bit depth format, relative to non-HDR formats that express color values using lower bit depths such as 8 or 10 bits per color channel. By way of a non-limiting example, an HDR input video 104 can be in an EXR file format with RGB color values expressed in a linear light RGB domain using a 16 bit floating point value for each color channel.

As shown in FIG. 1, the encoder 100 can perform at least one perceptual mapping operation 110 while encoding the input video 104 into the coded bitstream 106. A perceptual mapping operation 110 can convert linear color values from the input video 104 onto a values on a non-linear curve, based on one or more characteristics of the video's content. By way of non-limiting examples, the perceptual mapping operation 110 can be tailored to the content of the video based on its minimum brightness, average brightness, peak brightness, maximum contrast ratio, a cumulative distribution function, and/or any other factor. In some embodiments, such characteristics can be found through a histogram or statistical analysis of color components of the video's content.

The perceptual mapping operation 110 can be configured to redistribute linear color information on a non-linear curve that is tailored to the content of the input video 104. As will be discussed below, redistributing linear color values on a non-linear curve based on the content of the input video 104 can reduce the risk of distortion and/or noise being introduced through uniform quantization operations that may be perceptible to a human viewer. In some embodiments, a greater amount of bits and/or quantization levels can be allocated to ranges of intensities that are present in each color component and/or that are most likely to be perceived by a human viewer, while fewer bits and/or quantization levels can be allocated to intensities that are not present in the color channels and/or are less likely to be perceived by viewers.

By way of a non-limiting example, when a scene in the input video 104 is a scene that takes place at night, its pictures can primarily include dark colors that are substantially bunched together in the RGB domain. In such a scene, lighter colors in the RGB domain can be absent or rare. In this situation the perceptual mapping operation 110 can be adapted for the scene, such that the color values are redistributed on a non-linear curve that includes the range of colors actually present within the scene, while omitting or deemphasizing colors that are not present within the scene. As such, formerly bunched-together dark RGB values can be spread out substantially evenly on a curve of non-linear values, while less common brighter RGB values can be compressed together or even omitted if they are absent in the scene. As the dark values can be spread out on the curve, fine differences between them can be distinguished even when the values on the non-linear curve are uniformly quantized into discrete values or codewords.

As described above, the perceptual mapping operation 110 can be adaptive, such that it can change to generate different non-linear values depending on the content of the input video 104. In some embodiments or situations, the perceptual mapping operation 110 can be changed on a sub-picture level for different sub-areas of the same picture, such as processing windows, slices, macroblocks in AVC, or coding tree units (CTUs) in HEVC. In other embodiments or situations, the perceptual mapping operation 110 can be changed on a picture level for different pictures. In still other embodiments or situations, the perceptual mapping operation 110 can be changed on a supra-picture level for different sequences of pictures, such as different Groups of Pictures (GOPs).

A perceptual mapping operation 110 can be applied in any desired color space, such as the RGB or Y'CbCr color spaces. In some embodiments, if the input video 104 received by the encoder 100 indicates color values in a non-linear color space in a manner that is not dependent on the characteristics of the input video's content, such as a perceptual quantizer (PQ) space or gamma-corrected color space, the encoder 100 can convert those color values into linear space. The encoder 100 can then perform a perceptual mapping operation 110 to convert them back to a non-linear space, this time based on the actual content of the input video 104.

As will be discussed below, the encoder 100 can transmit one or more parameters 112 associated with the perceptual mapping operation 110 to the decoder 102, such that the decoder 102 can derive a corresponding reverse perceptual mapping operation 114 from the parameters 112. The decoder 102 can use the reverse perceptual mapping operation 114 to appropriately convert the perceptually mapped non-linear color values back into linear values when decoding the coded bitstream 106 into a decoded video 108. In some embodiments the reverse perceptual mapping operation 114 may not necessarily be an exact inverse of the perceptual mapping operation 110, but it can be configured to convert the perceptually mapped non-linear color values into linear values that approximate the original linear values such that noise and/or distortion introduced by uniform quantization of the perceptually mapped values is unlikely to be perceived by a human viewer.

Figure 2:
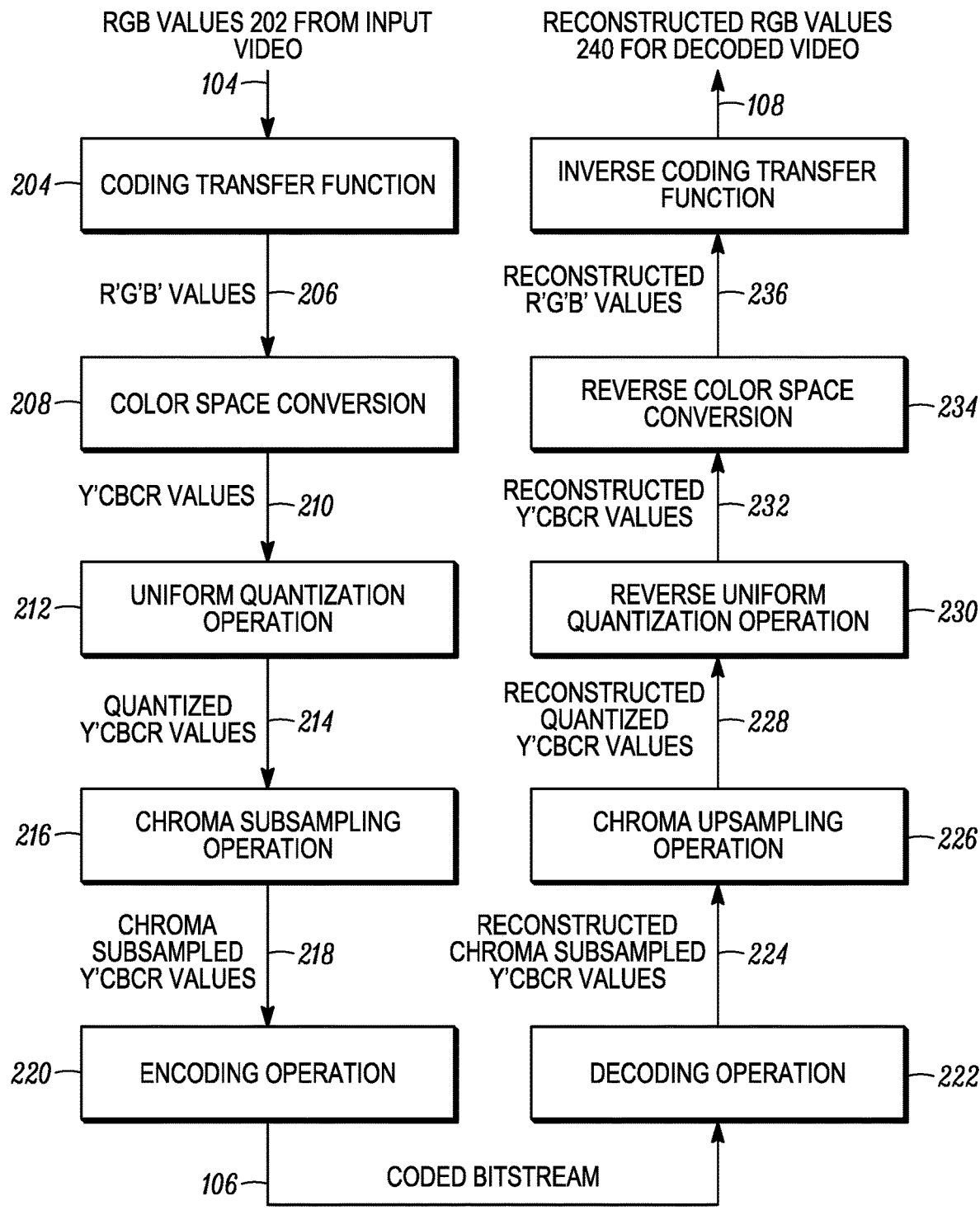
FIG. 2 depicts a first embodiment of a process for encoding an input video into a coded bitstream with an encoder using a perceptual mapping operation, and decoding that coded bitstream into a decoded video with a decoder using a reverse perceptual mapping operation.

FIG. 2 depicts a first embodiment of a process for encoding an input video 104 into a coded bitstream 106 with an encoder 100 using a perceptual mapping operation 110, and decoding that coded bitstream 106 into a decoded video 108 with a decoder 102 using a reverse perceptual mapping operation 114. In this embodiment, the perceptual mapping operation 110 is a coding transfer function 204 performed as one of the initial steps of the encoding process, while the reverse perceptual mapping operation 114 is an inverse coding transfer function 238 performed as one of the final steps of the decoding process.

As shown in FIG. 2, the encoder 100 can receive an input video 104. In some embodiments the input video 104 can be an HDR and/or WCG video that has color information indicated with RGB values 202 in a high bit depth format, such as color values expressed with a 16-bit floating point value for each RGB color channel.

After receiving the input video 104, the encoder 100 can perform a coding transfer function 204 on the RGB values 202 in each color channel to convert the HDR input video's RGB values 202 into non-linear R'G'B' values 206. By way of a non-limiting example, the RGB values 202 can be expressed on a linear scale, while corresponding non-linear R'G'B' values 206 can be expressed on a non-linear curve. As described above, the coding transfer function 204 can be a perceptual mapping operation 110 that is adaptive based on the content of the input video 104 on a sub-picture level, picture level, or supra-picture level.

In some embodiments, the non-linear R'G'B' values 206 generated with the coding transfer function 204 can be expressed with the same number of bits as the RGB values 202, such that the non-linear R'G'B' values 206 have the same bit depth. By way of a non-limiting example, when the RGB values 202 were expressed with 16-bit values, the non-linear R'G'B' values 206 can also be expressed with 16-bit values.

After using the coding transfer function 204 to generate non-linear R'G'B' values 206, the encoder 100 can perform color space conversion 208 to translate the non-linear R'G'B' values 206 into Y'CbCr values 210. By way of a non-limiting example, the Y' luma component can be calculated from a weighted average of the non-linear R'G'B' values 206. In some embodiments, the Y'CbCr values 210 can be expressed with the same number of bits as the RGB values 202 and/or the non-linear R'G'B' values 206, such that the Y'CbCr values 210 have the same bit depth. By way of a non-limiting example, when the original RGB values 202 were expressed with 16-bit values, the Y'CbCr values 210 can also be expressed with 16-bit values.

As described above, in some embodiments or situations the encoder 100 can receive RGB values 202 in a high bit depth format, perform an adaptive coding transfer function 204 based on the content of the input video 104, and then convert the resulting non-linear values into the Y'CbCr color space. In alternate embodiments or situations, the input video 104 can be received in a format wherein its values are already in the Y'CbCr format, and the adaptive coding transfer function 204 can operate to convert or redistribute those values along a curve based on the content of the input video 104, while the color space conversion 208 can be skipped if the resulting values are already in the desired format. In still other embodiments or situations, the color space conversion 208 and coding transfer function 204 can be reversed, such that the encoder 100 converts received color values to another format before applying an adaptive coding transfer function 204 based on the content of the input video 104.

The encoder 100 can perform a uniform quantization operation 212 on the Y'CbCr values 210 to generate quantized Y'CbCr values 214. The uniform quantization operation 212 can fit each of the Y'CbCr values 210 into one of a finite number of possible quantized Y'CbCr values 214. In some embodiments, each possible quantized Y'CbCr value 214 can be expressed with a codeword or other value in fewer bits than the bit depth of the Y'CbCr values 210. By way of a non-limiting example, when the input video 104 used 16-bit values for each of the RGB values 202, and that bit depth was carried through to the Y'CbCr values 210, the 16-bit Y'CbCr values 210 can be quantized into lower bit depth quantized Y'CbCr values 214, such as 8 or 10-bit quantized Y'CbCr values 214.

The step size between each possible quantized Y'CbCr value 214 can be uniform. The step size selected by the encoder 100 can influence the amount of distortion and/or noise introduced by the uniform quantization operation 212. By way of a non-limiting example, when the step size is selected such that two similar but different high bit depth Y'CbCr values 210 fall within the same range defined by the step size and both are converted into the same quantized Y'CbCr value 214, distortion and/or noise can be introduced as differences in the color information between the two high bit depth Y'CbCr values 210 are lost due to the uniform quantization operation 212. However, as discussed above, the previous coding transfer function 204 can have been configured to redistribute color information along a non-linear curve such that uniform quantization of that non-linear curve leads to distortion and/or noise that is unlikely to be perceived by a human viewer.

The encoder 100 can perform a chroma subsampling operation 216 to convert the quantized Y'CbCr values 214 into chroma subsampled Y'CbCr values 218. As the human eye is less sensitive to chroma information than luma information, the chroma subsampling operation 216 can subsample the Cb and Cr chroma components at a lower resolution to decrease the amount of bits dedicated to the chroma components, without impacting a viewer's perception of the Y' luma component. In some embodiments, the chroma subsampling operation 216 can implement 4:2:0 subsampling. By way of a non-limiting example, the quantized Y'CbCr values 214 can be expressed with a full 4:4:4 resolution, and the encoder 100 can subsample the Cb and Cr chroma components of the quantized Y'CbCr values 214 to express them as chroma subsampled Y'CbCr values 218 with 4:2:0 subsampling at half their horizontal and vertical resolution. In alternate embodiments, the chroma subsampling operation 216 can implement 4:2:2 subsampling, 4:1:1 subsampling, or any other subsampling ratio.

The encoder 100 can perform an encoding operation 220 on the chroma subsampled Y'CbCr values 218 to generate the coded bitstream 106. In some embodiments, the pixels of each picture can be broken into sub-pictures, such as processing windows, slices, macroblocks, or CTUs. The encoder 100 can encode each individual picture and/or sub-picture using intra-prediction and/or inter-prediction. Coding with intra-prediction uses spatial prediction based on other similar sections of the same picture or sub-picture, while coding with inter-prediction uses temporal prediction to encode motion vectors that point to similar sections of another picture or sub-picture, such as a preceding or subsequent picture in the input video 104. As such, coding of some pictures or sub-pictures can be at least partially dependent on other reference pictures in the same group of pictures (GOP).

The coded bitstream 106 generated by the encoder 100 can be transmitted to one or more decoders 102. The encoder 100 can also transmit one or more parameters 112 associated with the coding transfer function 204 on a sub-picture level, per picture level, and/or supra-picture level, such that the decoder 102 can derive a corresponding reverse coding transfer function 204 from the parameters 112 for each sub-picture, picture, or sequence of pictures.

Each decoder 102 can receive the coded bitstream 106 and perform a decoding operation 222 to generate reconstructed chroma subsampled Y'CbCr values 224 that approximate the chroma subsampled Y'CbCr values 218 output by the encoder's chroma subsampling operation 216. By way of a non-limiting example, the coded bitstream 106 can be decoded into reconstructed chroma subsampled Y'CbCr values 224 expressed with 4:2:0 subsampling. As with encoding, the decoder 102 can decode individual pictures and/or sub-pictures with intra-prediction and/or inter-prediction.

The decoder 102 can perform a chroma upsampling operation 226 to express the chroma components of the reconstructed chroma subsampled Y'CbCr values 224 with more bits, as reconstructed quantized Y'CbCr values 228. By way of a non-limiting example, when the reconstructed chroma subsampled Y'CbCr values 224 are 10-bit values expressed with 4:2:0 sub sampling at half the original resolution, the chroma upsampling operation 226 can copy, sample, and/or average the subsampled chroma information to generate the reconstructed quantized Y'CbCr values 228 at a full 4:4:4 resolution, such that they approximate the quantized Y'CbCr values 214 output by the encoder's uniform quantization operation 212.

The decoder 102 can perform a reverse quantization operation 230 on the reconstructed quantized Y'CbCr values 228, to generate reconstructed Y'CbCr values 232. The reverse quantization operation 230 can convert the low-bit depth reconstructed quantized Y'CbCr values 228 to higher bit depth reconstructed Y'CbCr values 232. By way of a non-limiting example, when the reconstructed quantized Y'CbCr values 228 are expressed with 10 bits, the reverse quantization operation 230 can convert the values to be expressed in a 16 bit format used for reconstructed Y'CbCr values 232. The reconstructed Y'CbCr values 232 can approximate the Y'CbCr values 210 output by the encoder's color space conversion 208.

The decoder 102 can perform reverse color space conversion 234 to translate the reconstructed Y'CbCr values 232 into reconstructed non-linear R'G'B' values 236. The reconstructed non-linear R'G'B' values 236 can have the same bit depth as the reconstructed Y'CbCr values 232, and can approximate the non-linear R'G'B' values 206 output by the encoder's coding transfer function 204.

The decoder 102 can perform an inverse coding transfer function 238 on the reconstructed non-linear R'G'B' values 236 in each color channel to convert the reconstructed non-linear R'G'B' values 236 into reconstructed RGB values 240. As will be discussed further below, the decoder 102 can have received parameters 112 from which it can derive an inverse coding transfer function 238 that effectively reverses the conversion between RGB values and R'G'B' values performed by the encoder's coding transfer function 204. The parameters 112 can be sent by the encoder 100 on a sub-picture level, a picture level, and/or a supra-picture level to indicate changes in the coding transfer function 204 and inverse coding transfer function 238 between different sub-pictures in the same picture, between pictures, or between sequences of pictures, as the coding transfer function 204 can change depending on the content of the input video 104.

After deriving an inverse coding transfer function 238 based on the received parameters 112, the decoder 102 can use the inverse coding transfer function 238 to convert the reconstructed non-linear R'G'B' values 236 into linear reconstructed RGB values 240 that approximate the original RGB values 202 of the input video 104. The reconstructed RGB values 240 can be used to display pictures to a viewer on a display screen.

Figure 3:
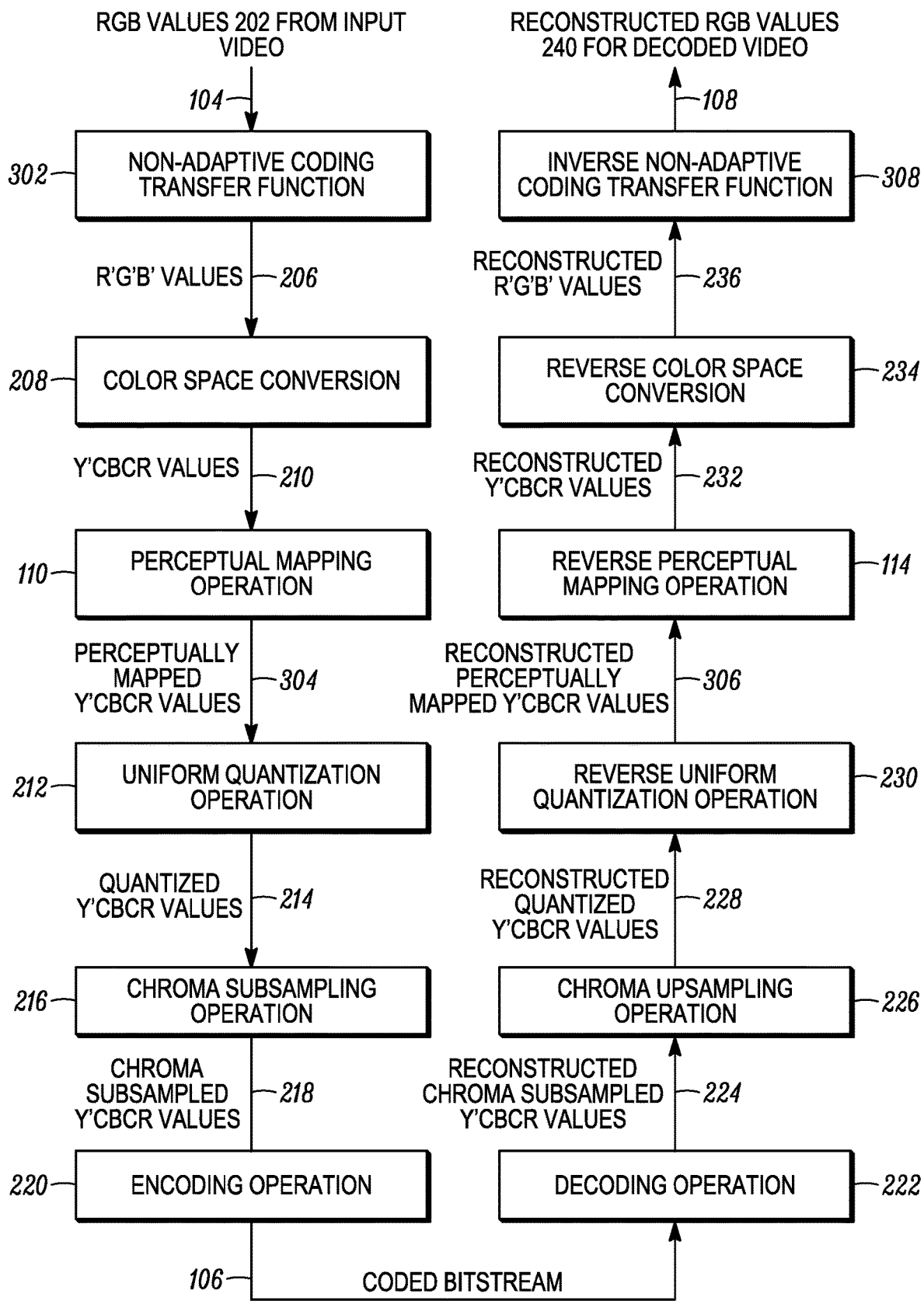
FIG. 3 depicts a second embodiment of a process for encoding an input video into a coded bitstream with an encoder using a perceptual mapping operation, and decoding that coded bitstream into a decoded video with a decoder using a reverse perceptual mapping operation.

FIG. 3 depicts a second embodiment of a process for encoding an input video 104 into a coded bitstream 106 with an encoder 100 using a perceptual mapping operation 110, and decoding that coded bitstream 106 into a decoded video 108 with a decoder 102 using a reverse perceptual mapping operation 114. In this embodiment, a perceptual mapping operation 110 is performed at the encoder 100 after a color space conversion 208 from R'G'B' values 206 into Y'CbCr values 210, prior to a uniform quantization operation 212. Similarly, in this embodiment a reverse perceptual mapping operation 114 is performed at the decoder 102 after a reverse uniform quantization operation 230, before a reverse color space conversion 234 into reconstructed R'G'B' values 236.

As shown in FIG. 3, the encoder 100 can receive an input video 104, such as a HDR and/or WCG video that has color information indicated with RGB values 202 in a high bit depth format. After receiving the input video 104, the encoder 100 can perform a non-adaptive coding transfer function 302 to convert the RGB values 202 in each color channel into R'G'B' values 206. In some embodiments, the non-adaptive coding transfer function 302 can be a fixed function that operates the same way for all input values, independent of the content of the input video 104. In other embodiments, the non-adaptive coding transfer function 302 can be a pass-through function, such that the R'G'B' values 206 are substantially identical to the RGB values 202.

As in the embodiment of FIG. 2, the encoder 100 can perform color space conversion 208 to translate the R'G'B' values 206 into Y'CbCr values 210. In some embodiments, the Y'CbCr values 210 can be expressed with the same number of bits as the RGB values 202 and/or the R'G'B' values 206, such that the Y'CbCr values 210 have the same bit depth. In alternate embodiments or situations, the encoder 100 can receive an input video with values already described in a Y'CbCr color space, such that color space conversion 208 can be skipped. In still other embodiments, the order of the coding transfer function 302 and color space conversion 208 can be reversed.

In this embodiment, the encoder 100 can perform a perceptual mapping operation 110 on the Y'CbCr values 210 to generate perceptually mapped Y'CbCr values 304. As described above, a perceptual mapping operation 110 can be adaptive based on the content of the input video 104 on a sub-picture level, picture level, or supra-picture level. In some embodiments the perceptual mapping operation 110 can use a 3D lookup table that maps Y'CbCr values 210 to associated perceptually mapped Y'CbCr values 304. In other embodiments, the perceptual mapping operation 110 can use one or more formulas to convert each color component. By way of a non-limiting example, the perceptual mapping operation 110 can convert values using formulas such as:

$$Y\_PM = f(Y', Cb, Cr)$$

$$Cb\_PM = g(Y', Cb, Cr)$$

$$Cr\_PM = h(Y', Cb, Cr)$$

In this example, the functions can each take the three Y'CbCr values 210 as inputs and output a perceptually mapped Y'CbCr value 304, Y'_PM, Cb_PM, or Cr_PM. The 3D lookup table or conversion functions can be adaptive based on the content of the input video 104.

After generating perceptually mapped Y'CbCr values 304 with the perceptual mapping operation 110, the encoder 100 can perform a uniform quantization operation 212 on the perceptually mapped Y'CbCr values 304 to generate quantized Y'CbCr values 214. In some embodiments, each possible quantized Y'CbCr value 214 can be expressed with a codeword or other value in fewer bits than the bit depth of the perceptually mapped Y'CbCr values 304.

The step size between each possible quantized Y'CbCr value 214 can be uniform. However, as discussed above, the perceptual mapping operation 110 can have been configured to redistribute color information along a non-linear curve such that uniform quantization of that non-linear curve leads to distortion and/or noise that is unlikely to be perceived by a human viewer.

As with the embodiment of FIG. 2, the encoder 100 can perform a chroma sub sampling operation 216 to convert the quantized Y'CbCr values 214 into chroma subsampled Y'CbCr values 218, and then perform an encoding operation 220 on the chroma subsampled Y'CbCr values 218 to generate the coded bitstream 106.

The coded bitstream 106 generated by the encoder 100 can be transmitted to one or more decoders 102, as well as one or more parameters 112 associated with the perceptual mapping operation 110 on a sub-picture level, per picture level, and/or supra-picture level, such that the decoder 102 can derive a corresponding reverse perceptual mapping operation 114 from the parameters 112 for each sub-picture, picture, or sequence of pictures.

As with the embodiment of FIG. 2, each decoder 102 can receive the coded bitstream 106 and perform a decoding operation 222 to generate reconstructed chroma subsampled Y'CbCr values 224 that approximate the chroma subsampled Y'CbCr values 218 output by the encoder's chroma subsampling operation 216. The decoder 102 can perform a chroma upsampling operation 226 to express the chroma components of the reconstructed chroma subsampled Y'CbCr values 224 with more bits, as reconstructed quantized Y'CbCr values 228 that approximate the quantized Y'CbCr values 214 output by the encoder's uniform quantization operation 212.

The decoder 102 can perform a reverse quantization operation 230 on the reconstructed quantized Y'CbCr values 228, to generate reconstructed perceptually mapped Y'CbCr values 306. The reverse quantization operation 230 can convert the low-bit depth reconstructed quantized Y'CbCr values 228 to higher bit depth reconstructed perceptually mapped Y'CbCr values 306. By way of a non-limiting example, when the reconstructed quantized Y'CbCr values 228 are expressed with 10 bits, the reverse quantization operation 230 can convert the values to be expressed in a 16 bit format used for reconstructed perceptually mapped Y'CbCr values 306. The reconstructed perceptually mapped Y'CbCr values 306 can approximate the perceptually mapped Y'CbCr values 304 output by the encoder's perceptual mapping operation 110.

In this embodiment, the decoder 102 can perform a reverse perceptual mapping operation 114 on the reconstructed perceptually mapped Y'CbCr values 306 to generate reconstructed Y'CbCr values 232. As will be discussed further below, the decoder 102 can have received parameters 112 from which it can derive a reverse perceptual mapping operation 114 that effectively reverses the conversion between Y'CbCr values 210 and perceptually mapped Y'CbCr values 304 performed by the encoder's perceptual mapping operation 110. The parameters 112 can be sent by the encoder 100 on a sub-picture level, a picture level, and/or a supra-picture level to indicate changes in the perceptual mapping operation 110 and reverse perceptual mapping operation 114 between different sub-pictures in the same picture, between pictures, or between sequences of pictures, as the perceptual mapping operation 110 can change depending on the content of the input video 104.

The decoder 102 can perform reverse color space conversion 234 to translate the reconstructed Y'CbCr values 232 into reconstructed non-linear R'G'B' values 236. The reconstructed non-linear R'G'B' values 236 can have the same bit depth as the reconstructed Y'CbCr values 232, and can approximate the R'G'B' values 206 output by the encoder's coding transfer function 302.

The decoder 102 can perform an inverse non-adaptive coding transfer function 308 on the reconstructed R'G'B' values 236 in each color channel to convert the reconstructed R'G'B' values 236 into reconstructed RGB values 240. In some embodiments, the inverse non-adaptive coding transfer function 308 can be a fixed function that operates the same way for all input values. In other embodiments, the inverse non-adaptive coding transfer function 308 can be a pass-through function, such that the reconstructed RGB values 240 are substantially identical to the reconstructed R'G'B' values 236. The reconstructed RGB values 240 can be used to display pictures to a viewer on a display screen.

FIG. 3 depicts a third embodiment of a process for encoding an input video 104 into a coded bitstream 106 with an encoder 100 using a perceptual mapping operation 110, and decoding that coded bitstream 106 into a decoded video 108 with a decoder 102 using a reverse perceptual mapping operation 114.

Figure 4:
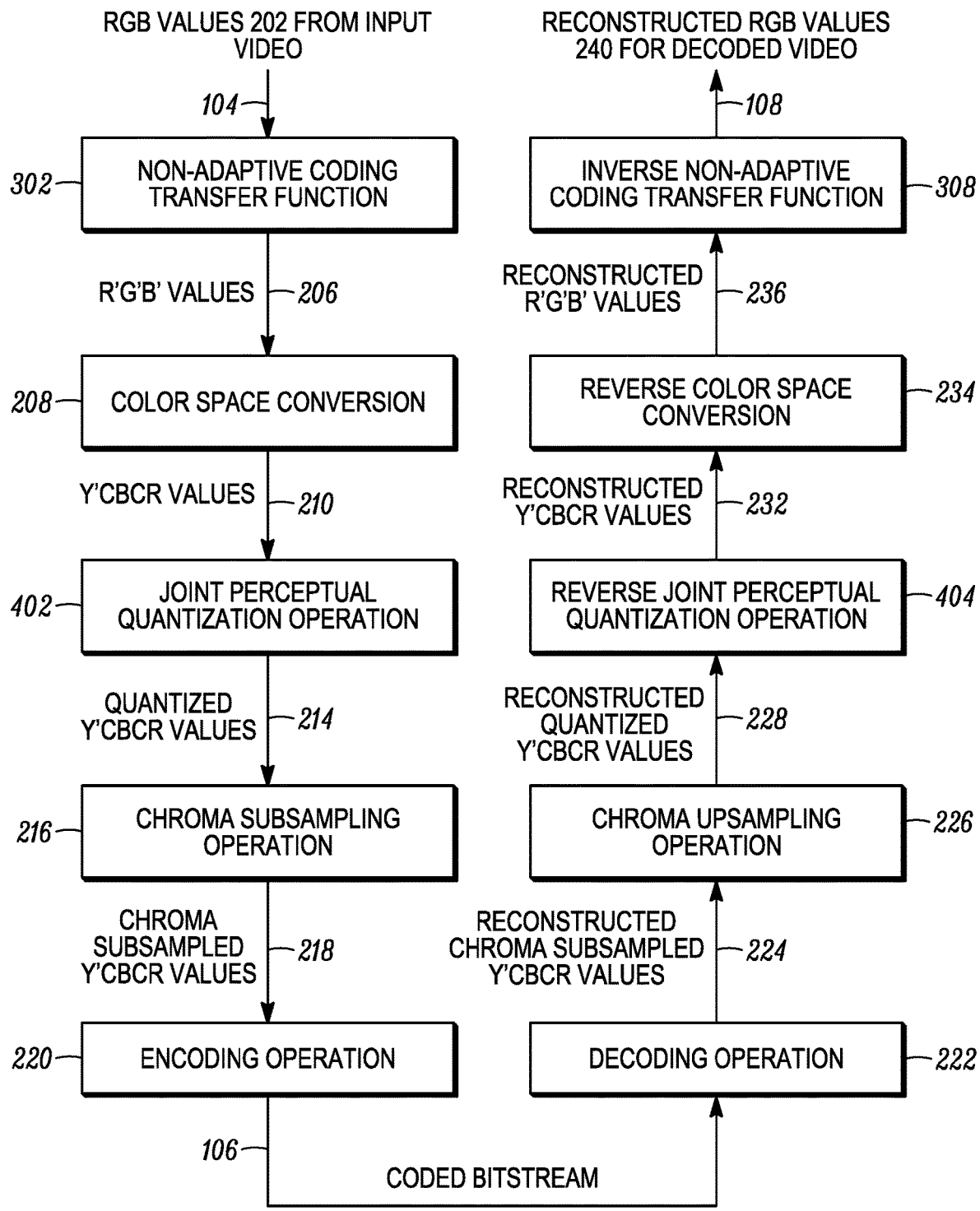
FIG. 4 depicts a third embodiment of a process for encoding an input video into a coded bitstream with an encoder using a perceptual mapping operation, and decoding that coded bitstream into a decoded video with a decoder using a reverse perceptual mapping operation.

The embodiment of FIG. 3 can be substantially similar to the embodiment of FIG. 4, with the standalone perceptual mapping operation 110 and uniform quantization operation 212 replaced with a joint perceptual quantization operation 402 at the encoder 100. Similarly, at the decoder 102 the standalone reverse uniform quantization operation 230 and reverse perceptual mapping operation 114 can be replaced with a reverse joint perceptual quantization operation 404 in the embodiment of FIG. 4.

In this embodiment, the Y'CbCr values 210 output by the color space conversion 208 can be converted into quantized Y'CbCr values 214 using a joint perceptual quantization operation 402 that can be adaptive based on the content of the input video 104 on a sub-picture level, picture level, or supra-picture level. While the uniform quantization operation 212 in the embodiments of FIGS. 2 and 3 can be performed independently on each color component, the joint perceptual quantization operation 402 can take all three color components into consideration.

In some embodiments the joint perceptual quantization operation 402 can use a 3D lookup table that maps Y'CbCr values 210 to associated quantized Y'CbCr values 214. In other embodiments, the joint perceptual quantization operation 402 can use one or more formulas to quantize each color component. By way of a non-limiting example, the joint perceptual quantization operation 402 can quantize values using formulas such as:

$$D_{Y'}=Q1(Y',Cb,Cr)$$

$$D_{Cb}=Q2(Y',Cb,Cr)$$

$$D_{Cr}=Q3(Y',Cb,Cr)$$

In this example, the functions can each take the three Y'CbCr values 210 as inputs and output a quantized Y'CbCr value 214, $D_{Y'}$, $D_{Cb}$, or $D_{Cr}$. The 3D lookup table or quantization functions can be adaptive based on the content of the input video 104. While in some embodiments the step size can be uniform between each possible quantized Y'CbCr value 214, the joint perceptual quantization operation 402 can be configured to redistribute and quantize color information such that any distortion and/or noise it introduces is unlikely to be perceived by a human viewer. In some embodiments, each possible quantized Y'CbCr value 214 that can be generated with the joint perceptual quantization operation 402 can be expressed with a codeword or other value in fewer bits than the bit depth of the Y'CbCr values 210.

As in the embodiments of FIGS. 2 and 3, the encoder 100 can perform a chroma subsampling operation 216 to convert the quantized Y'CbCr values 214 into chroma subsampled Y'CbCr values 218, and then perform an encoding operation 220 on the chroma subsampled Y'CbCr values 218 to generate the coded bitstream 106.

The coded bitstream 106 generated by the encoder 100 can be transmitted to one or more decoders 102, as well as one or more parameters 112 associated with the joint perceptual quantization operation 402 on a sub-picture level, per picture level, and/or supra-picture level, such that the decoder 102 can derive a corresponding reverse joint perceptual quantization operation 404 from the parameters 112 for each sub-picture, picture, or sequence of pictures.

As with the embodiment of FIGS. 2 and 3, each decoder 102 can receive the coded bitstream 106 and perform a decoding operation 222 to generate reconstructed chroma subsampled Y'CbCr values 224 that approximate the chroma subsampled Y'CbCr values 218 output by the encoder's chroma subsampling operation 216. The decoder 102 can perform a chroma upsampling operation 226 to express the chroma components of the reconstructed chroma subsampled Y'CbCr values 224 with more bits, as reconstructed quantized Y'CbCr values 228 that approximate the quantized Y'CbCr values 214 output by the encoder's joint perceptual quantization operation 402.

The decoder 102 can perform a reverse joint perceptual quantization operation 404 on the reconstructed quantized Y'CbCr values 228, to generate reconstructed Y'CbCr values 232. As will be discussed further below, the decoder 102 can have received parameters 112 from which it can derive a reverse joint perceptual quantization operation 404 that effectively reverses the conversion between Y'CbCr values 210 and quantized Y'CbCr values 214 performed by the encoder's joint perceptual quantization operation 402. The parameters 112 can be sent by the encoder 100 on a sub-picture level, a picture level, and/or a supra-picture level to indicate changes in the joint perceptual quantization operation 402 and reverse joint perceptual quantization operation 404 between different sub-pictures in the same picture, between pictures, or between sequences of pictures, as the perceptual mapping operation 110 can change depending on the content of the input video 104.

The reverse joint perceptual quantization operation 404 can also convert the low-bit depth reconstructed quantized Y'CbCr values 228 to higher bit depth reconstructed Y'CbCr values 232. By way of a non-limiting example, when the reconstructed quantized Y'CbCr values 228 are expressed with 10 bits, the reverse joint perceptual quantization operation 404 can convert the values to be expressed in a 16 bit format used for reconstructed Y'CbCr values 232. The reconstructed Y'CbCr values 232 can approximate the Y'CbCr values 210 output by the encoder's color space conversion 208.

The decoder 102 can perform reverse color space conversion 234 to translate the reconstructed Y'CbCr values 232 into reconstructed R'G'B' values 236, followed by an inverse non-adaptive coding transfer function 308 to convert the reconstructed R'G'B' values 236 into reconstructed RGB values 240. The reconstructed RGB values 240 can be used to display pictures to a viewer on a display screen.

As shown above, in various embodiments a perceptual mapping operation 110 can be performed in an initial coding transfer function 204, as a standalone step at a later portion of the encoding process after color space conversion, or as part of a joint perceptual quantization operation 402. In alternate embodiments a perceptual mapping operation 110 can be performed after a uniform quantization step, after a chroma subsampling step, or at any other step of the encoding process. The decoder 102 can perform its decoding process with corresponding steps in substantially the reverse order from the encoding process.

In some embodiments the encoder 100 can send the decoder 102 information about a 3D lookup table it used with the perceptual mapping operation 110, or send complete information about conversion functions it used within the perceptual mapping operation 110, for each sub-picture level, picture level, or supra-picture level. As such, the decoder 102 can determine an associated reverse perceptual mapping operation 114 to use during the decoding process.

However, in other embodiments the encoder 100 can save bandwidth by transmitting parameters 112 associated with the perceptual mapping operation 110 it used at each sub-picture level, picture level, or supra-picture level. The decoder 102 can use the received parameters 112 to generate and use a corresponding reverse perceptual mapping operation 114 for each sub-picture level, picture level, or supra-picture level.

Various non-limiting examples of possible coding transfer functions 204, and the parameters 112 associated with them that can be sent to the decoder 102 to derive inverse coding transfer functions 238, will be provided below. In these examples, the encoder's coding transfer function 204 can be denoted as $\psi(i)=v$, such that it can use a brightness or intensity value I in a color component as an input and output a converted value denoted as v. Similarly, while the decoder's inverse coding transfer function 238 can be denoted as $\psi^{-1}(v)=I$, such that it can take a value v and convert it back to a value I. The encoder's uniform quantization operation 212 can be denoted as Q (v), as it can operate on converted v values generated by the coding transfer function 204. The step size between quantization levels used in the uniform quantization operation 212 can be denoted as $\Delta_{step}$.

The effective quantization step size, Q(I), of a cascaded adaptive coding transfer function 204 and a uniform quantization operation 212 can be proportional to the slope of the inverse coding transfer function 238, as shown below:

$$Q(I) = Q(\psi^{-1}(v)) \approx \frac{d\psi^{-1}(v)}{dv} \cdot \Delta_{step}$$

The effective quantization step size, Q(I), can thus depend on the slope of the inverse coding transfer function 238 and the step size $\Delta_{step}$ of the uniform quantization operation 212. For example, when the slope of the inverse coding transfer function 238 decreases, the effective quantization step size Q(I) can decrease. When the step size $\Delta_{step}$ of the uniform quantization operation 212 is large enough that distortion and/or noise introduced by uniform quantization would otherwise be perceptible to human viewers, the effects of the relatively large step size $\Delta_{step}$ can be modulated by adapting the coding transfer function 204 to the content of the input video 104, such that the slope of the inverse coding transfer function 238 is smaller. As such, decreasing the slope of the inverse coding transfer function 238 can counteract the effects of a relatively large step size $\Delta_{step}$, and thus modulate the effective quantization step size Q(I) such that the overall distortion and/or noise is less likely to be perceived by a human viewer.

The effective quantization step size Q(I) can be included in a related metric, the relative quantization step size, $\Lambda(I)$, wherein:

$$\Lambda(I) = \frac{Q(I)}{I}$$

$$\Lambda(I) = \Lambda(\psi^{-1}(v)) = \frac{d\psi^{-1}(v)}{dv} \cdot \frac{1}{\psi^{-1}(v)} \cdot \Delta_{step}$$

The coding transfer function 204, and thus the corresponding inverse coding transfer function 238, can be adapted based on the content of the input video 104 such that the relative quantization step size $\Lambda(I)$ stays below a set threshold level. For example, the threshold level can be defined by a function $\Lambda_0(I)$ that gives an optimal slope for the inverse coding transfer function 238 that results in encoding with distortion and noise that is perceptually transparent or perceptually lossless. As such the coding transfer function 204, and thus the corresponding inverse coding transfer function 238, can be adapted such that $\Lambda(I) \leq \Lambda_0(I)$.

Similarly, if a perceptually minor or "just noticeable" contrast condition is considered acceptable and is defined by $\Lambda_0(I)$, the following differential equation can apply:

$$\frac{d\psi^{-1}(v)}{dv} \cdot \Delta_{step} - \psi^{-1}(v) \cdot \Lambda_0(\psi^{-1}(v)) = 0$$

As such, solving the above differential equation for $\psi^{-1}(v)$ can provide the decoder's inverse coding transfer function 238 for the desired $\Lambda_0(I)$. Similarly, the relative quantization step size $\Lambda(I)$ can be calculated for any given inverse transfer function 238.

As a first non-limiting example, the coding transfer function 204 and inverse coding transfer function 238 can be based on the first variant of Weber's Law, such that:

$$v_N = \overline{\psi}_{WL1}(I_N) = \begin{cases} \frac{\ln(C \cdot I_N)}{\ln(C)}, & I_N \geq \frac{e}{C} \\ \frac{C}{e \cdot \ln(C)} \cdot I_N, & I_N < \frac{e}{C} \end{cases}$$

$$I_N = \overline{\psi}_{WL1}^{-1}(v_N) = \begin{cases} C^{v_N-1}, & v_N \geq \frac{1}{\ln(C)} \\ \frac{v \cdot e \cdot \ln(C)}{C}, & v_N < \frac{1}{\ln(C)} \end{cases}$$

In this and other examples below, $I_N$ can be a normalized brightness of a portion of the input video 104, on a sub-picture level, picture level, or supra-picture level. The normalized brightness can a brightness level divided by the maximum brightness, such that $$I_N = \frac{I}{I_{max}}$$

In this and other examples below, C can be the maximum contrast in the portion of the input video 104 on a sub-picture level, picture level, or supra-picture level. The maximum contrast can be the maximum brightness divided by the minimum brightness, such that:

$$C = \frac{I_{max}}{I_{min}}$$

In these and other examples below, $v_N$ can be a value generated by the coding transfer function 204, normalized by the dynamic range of the uniform quantizer operation 202, denoted as D, such that:

$$v_N = \frac{v}{D}$$

From the above definitions, the relative quantization step size for the first variant of Weber's Law can therefore be given by:

$$\Lambda_{WL1}(I_N) = \begin{cases} \ln(C) \cdot \Delta_{step}, & I_N \geq \frac{e}{C} \\ \frac{e \cdot \ln(C)}{C} \cdot I_N^{-1} \cdot \Delta_{step}, & I_N < \frac{e}{C} \end{cases}$$

As a second non-limiting example, the coding transfer function 204 and inverse coding transfer function 238 can be based on the second variant of Weber's Law, such that:

$$v_N = \overline{\psi}_{WL2}(I_N) = \frac{\ln(C \cdot I_N + 1)}{\ln(C + 1)}$$

$$I_N = \overline{\psi}_{WL2}^{-1}(v_N) = \frac{(C + 1)^{v_N} - 1}{C}$$

From this, the relative quantization step size for the second variant of Weber's Law can therefore be given by:

$$\Lambda_{WL2}(I_N) = \ln(C + 1) \cdot \left( \frac{C \cdot I_N + 1}{C \cdot I_N} \right) \cdot \Delta_{step}$$

Figure 5:
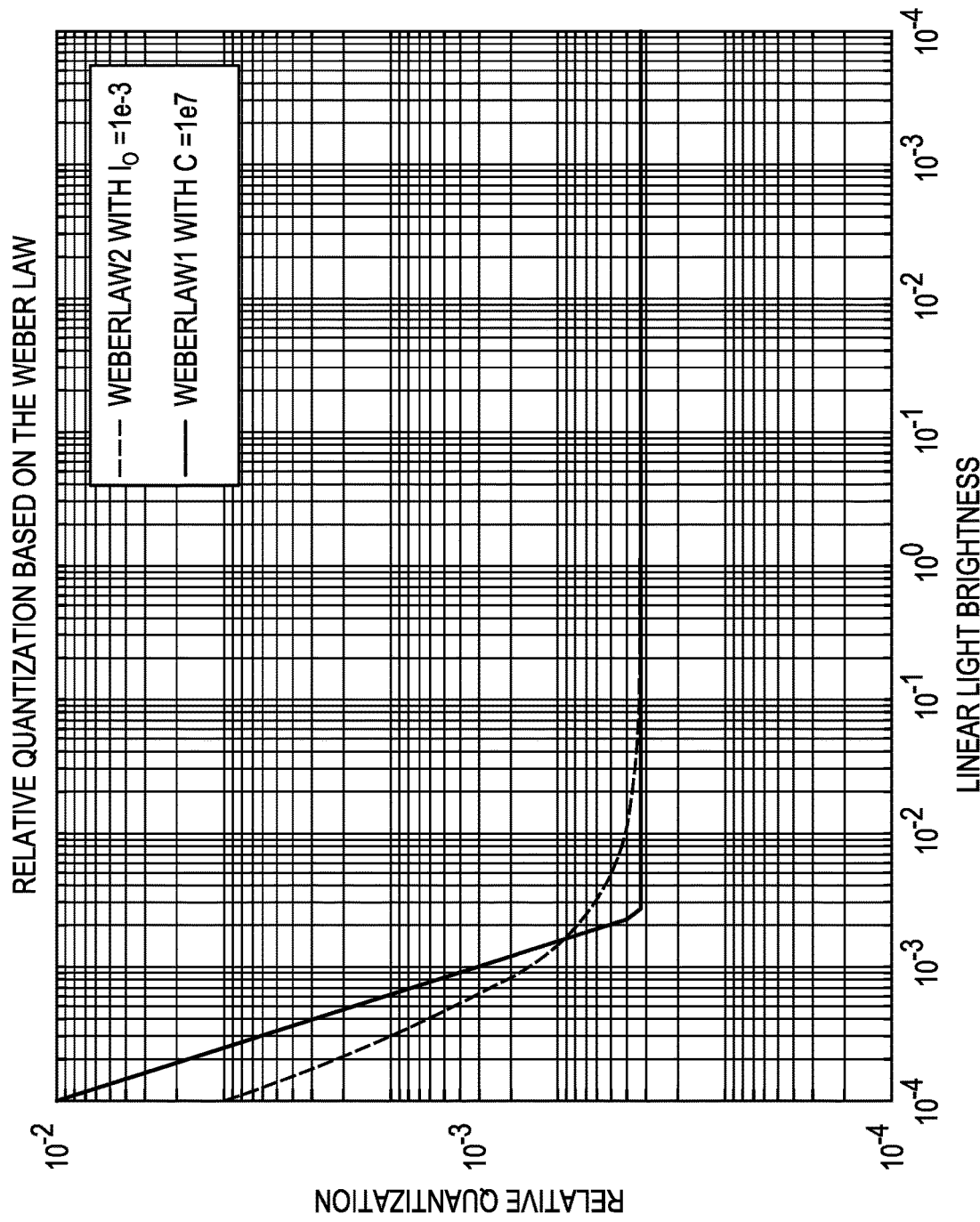
FIG. 5 depicts an exemplary plot of relative quantization step sizes from variants of Weber's Law on a log-log scale.

The relative quantization step sizes of the two examples above based on variants of Weber's Law can be plotted on a log-log scale, as shown in FIG. 5. The slope of the relative quantization step size based on the first variant of Weber's Law can be linear on the log-log scale with a negative slope for small values of $I_N$, and then be flat (linear on the log-log scale with a slope of 0) for values of $I_N$ that are larger than a particular point. Similarly, the slope of the relative quantization step size based on the second variant of Weber's Law can be negative for small values of $I_N$, and then transition smoothly to approaching a flat slope for larger values of $I_N$. The two variants can thus be similar, with the second variant having a smoother transition between the $I_N$ ranges that have different slopes.

As a third non-limiting example, the coding transfer function 204 and inverse coding transfer function 238 can be based on the first variant of Stevens' Power Law, such that:

$$v_N = \overline{\psi}_{SPL1}(I_N) = \begin{cases} \frac{[(I_N \cdot C)^\gamma - 1]}{(C^\gamma - 1)}, & I_N \geq \frac{C^{-1}}{(1 - \gamma)^{1/\gamma}} \\ \frac{\gamma \cdot C}{(C^\gamma - 1) \cdot (1 - \gamma)^{\left(1 - \frac{1}{\gamma}\right)}} \cdot I_N, & I_N < \frac{C^{-1}}{(1 - \gamma)^{1/\gamma}} \end{cases}$$

$$I_N = \overline{\psi}_{SPL1}^{-1}(v_N) = \begin{cases} C^{-1} \cdot [(C^\gamma - 1) \cdot v_N + 1]^{1/\gamma}, & v_N \geq \frac{\gamma}{(C^\gamma - 1) \cdot (1 - \gamma)} \\ \frac{(C^\gamma - 1) \cdot (1 - \gamma)^{\left(1 - \frac{1}{\gamma}\right)}}{\gamma \cdot C} \cdot v_N, & v_N < \frac{\gamma}{(C^\gamma - 1) \cdot (1 - \gamma)} \end{cases}$$

From this, the relative quantization step size for the first variant of Stevens' Power Law can therefore be given by:

$$\Lambda_{SPL1}(I_N) = \begin{cases} \frac{(1 - C^{-\gamma})}{\gamma} \cdot I_N^{-\gamma} \cdot \Delta_{step}, & I_N \geq \frac{C^{-1}}{(1 - \gamma)^{1/\gamma}} \\ \frac{(C^\gamma - 1) \cdot (1 - \gamma)^{\left(1 - \frac{1}{\gamma}\right)}}{\gamma \cdot C} \cdot I_N^{-1} \cdot \Delta_{step}, & I_N < \frac{C^{-1}}{(1 - \gamma)^{1/\gamma}} \end{cases}$$

As a fourth non-limiting example, the coding transfer function 204 and inverse coding transfer function 238 can be based on the third variant of Stevens' Power Law, such that:

$$v_N = \overline{\psi}_{SPL3}(I_N) = \frac{(I_N \cdot C + 1)^\gamma - 1}{(C + 1)^\gamma - 1}$$

$$I_N = \overline{\psi}_{SPL3}^{-1}(v_N) = C^{-1} \cdot \left[ [v_N \cdot ((C + 1)^\gamma - 1) + 1]^{\frac{1}{\gamma}} - 1 \right]$$

From this, the relative quantization step size for the third variant of Stevens' Power Law can therefore be given by:

$$\Lambda_{SPL3}(I_N) = ((C+1)^\gamma - 1) \cdot (I_N \cdot C + 1)^{-\gamma} \cdot \frac{I_N \cdot C + 1}{\gamma \cdot I_N \cdot C} \cdot \Delta_{step}$$

Figure 6:
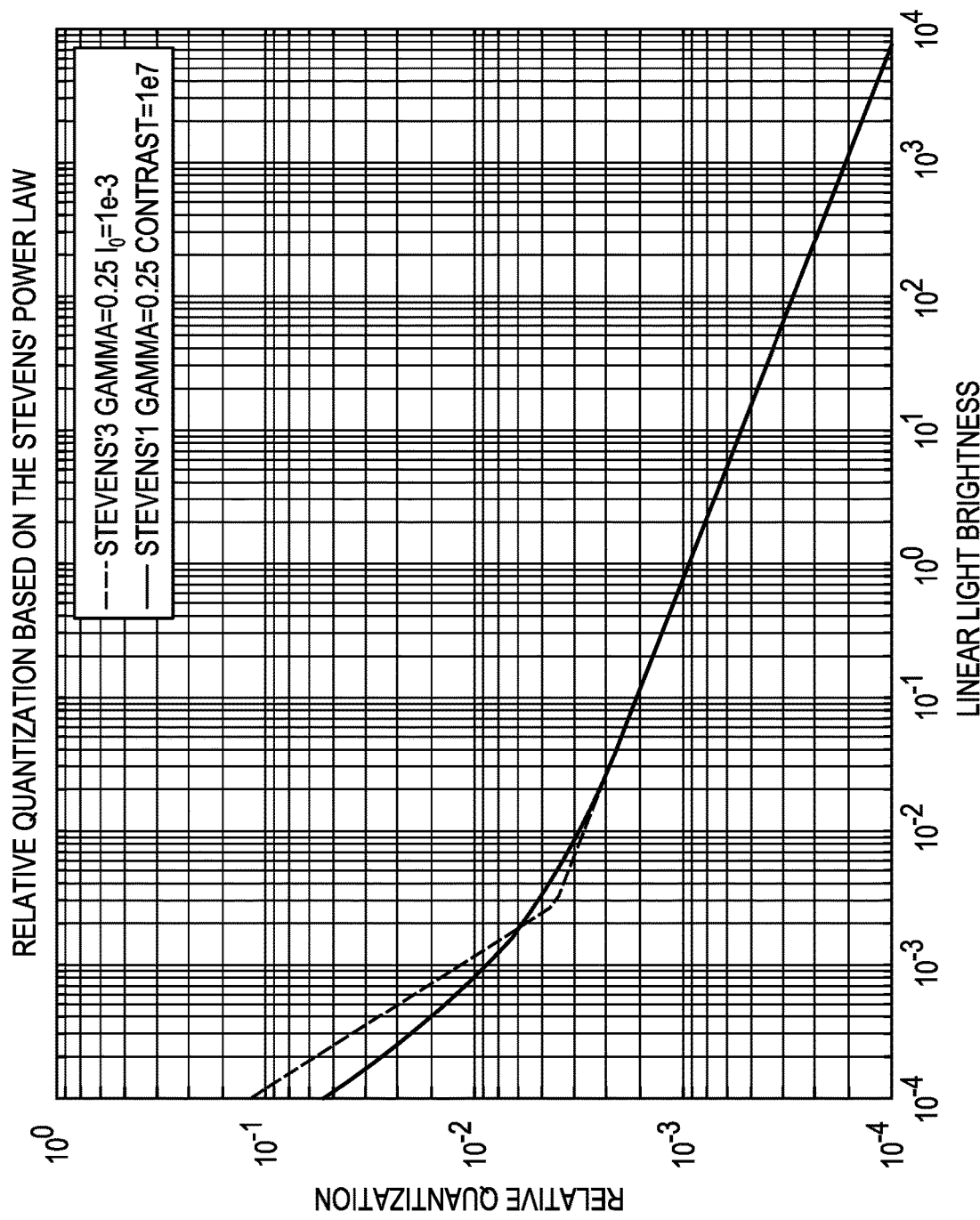
FIG. 6 depicts an exemplary plot of relative quantization step sizes from variants of Stevens' Power Law on a log-log scale.

The relative quantization step sizes of the two examples above based on variants of Stevens' Power Law can be plotted on a log-log scale, as shown in FIG. 6. In both of these examples, the slope of the relative quantization step size can have or approach a slope of −1 for small values of $I_N$, and have or approach a slope of −γ for large values of $I_N$, with the two examples varying on the smoothness of the transition between the $I_N$ ranges that have different slopes. Additionally, as γ goes to 0, the first variant of Stevens' Power Law can converge with the first variant of Weber's Law, while the third variant of Stevens' Power Law can converge with the second variant of Weber's Law.

As shown in the examples above, the slope of the curve of relative quantization step sizes Λ(I) can differ for different brightness values. As such, when the coding transfer function 204 is adaptive and can be changed based on perceptual and/or statistical properties of the input video 104 on a sub-picture level, a picture level, or a supra-picture level, the overall shape of the Λ(I) curve can change.

By sending parameters 112 from the encoder 100 to the decoder 102 that describe the Λ(I) function, the decoder 102 can derive the inverse coding transfer function 238 from the Λ(I) function, by solving for $\psi^{-1}(v)$ in the following differential equation:

$$\frac{d\psi^{-1}(v)}{dv} \cdot \Delta_{step} - \psi^{-1}(v) \cdot \Lambda_0(\psi^{-1}(v)) = 0$$

As such, the encoder 100 can send one or more parameters 112 that describe the shape of the Λ(I) curve to the decoder 102 at each sub-picture level, picture level, or supra-picture level, so that the decoder 102 can derive the appropriate inverse coding transfer function 238. Since the coding transfer function 204 and thus the Λ(I) function can change throughout the encoding process based on the content of the input video 104, the encoder 100 can save bandwidth by sending a relatively small number of parameters 112 that describe the Λ(I) curve at each sub-picture level, picture level, or supra-picture level, compared to sending the full inverse coding transfer function 238 or a full lookup table showing mappings between all possible converted values at every sub-picture level, picture level, or supra-picture level.

By way of a first non-limiting example, the shape of the Λ(I) curve can be expressed through a piecewise log-linear function such as a variant of Weber's Law or Stevens' Power Law, as shown above. As such, in some embodiments the encoder 100 can send two parameters 112 to the decoder 102 at each sub-picture level, picture level, or supra-picture level: a normalized brightness value $I_N$ and a maximum contrast value C. From these two parameters 112, the decoder 102 can find Λ(I) using a predetermined piecewise log-linear function, and thus derive the appropriate inverse coding transfer function 238 to use when decoding values at that sub-picture level, picture level, or supra-picture level.

By way of a second non-limiting example, the shape of the Λ(I) curve can be expressed through a second order log-polynomial, a polynomial in a logarithmic domain. In these embodiments, parameters 112 describing the second order log-polynomial can be sent from the encoder 100 to the decoder 102 for each sub-picture level, picture level, or supra-picture level, such that the decoder 102 can find Λ(I) from the parameters 112 and derive the appropriate inverse coding transfer function 238 for the coding level. By way of a non-limiting example, a second order log-polynomial with three parameters a, b, and c can be given by:

$$\log(\Lambda(I)) = a \cdot (\log(I))^2 + b \cdot \log(I) + c$$

In this example, the encoder 100 can send values of the parameters a, b, and c to the decoder 102. The decoder 102 can use the received parameters in the predefined formula to find Λ(I) from the parameters 112 and from it derive a corresponding inverse coding transfer function 238.

In other embodiments, the encoder 100 can directly send one or more parameters 112 that describe a particular coding transfer function 204 or other perceptual mapping operation 110, and/or a particular inverse coding transfer function 238 or other reverse perceptual mapping operation 114. In some embodiments, the coding transfer function 204 or other perceptual mapping operation 110 can be a perceptual quantizer (PQ) transfer function. By way of a non-limiting example, in some embodiments the PQ transfer function can be a function that operates on Luminance values, L, with the function defined as:

$$PQ(L) = \left( \frac{c_1 + c_2 L^{m_1}}{1 + c_3 L^{m_1}} \right)^{m_2}$$

In this example, parameters 112 that can be sent from the encoder 100 to the decoder 102 at each sub-picture level, picture level, or supra-picture level include one or more of: $m_1$, $m_2$, $c_1$, $c_2$, $c_3$. For instance, in one non-limiting exemplary implementation, the values of the parameters 112 can be as follows:

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6876$$

In some embodiments or situations, the values of one or more of these parameters 112 can be predetermined, such that they are known to both the encoder 100 and decoder 102. As such, the encoder 100 can send less than all of the parameters 112 to the decoder 102 to adjust the PQ curve. By way of a non-limiting example, all the parameters 112 except for $m_2$ can be preset, such that the encoder 100 only sends the value of $m_2$ it used at each coding level to the decoder 102.

Figure 7:
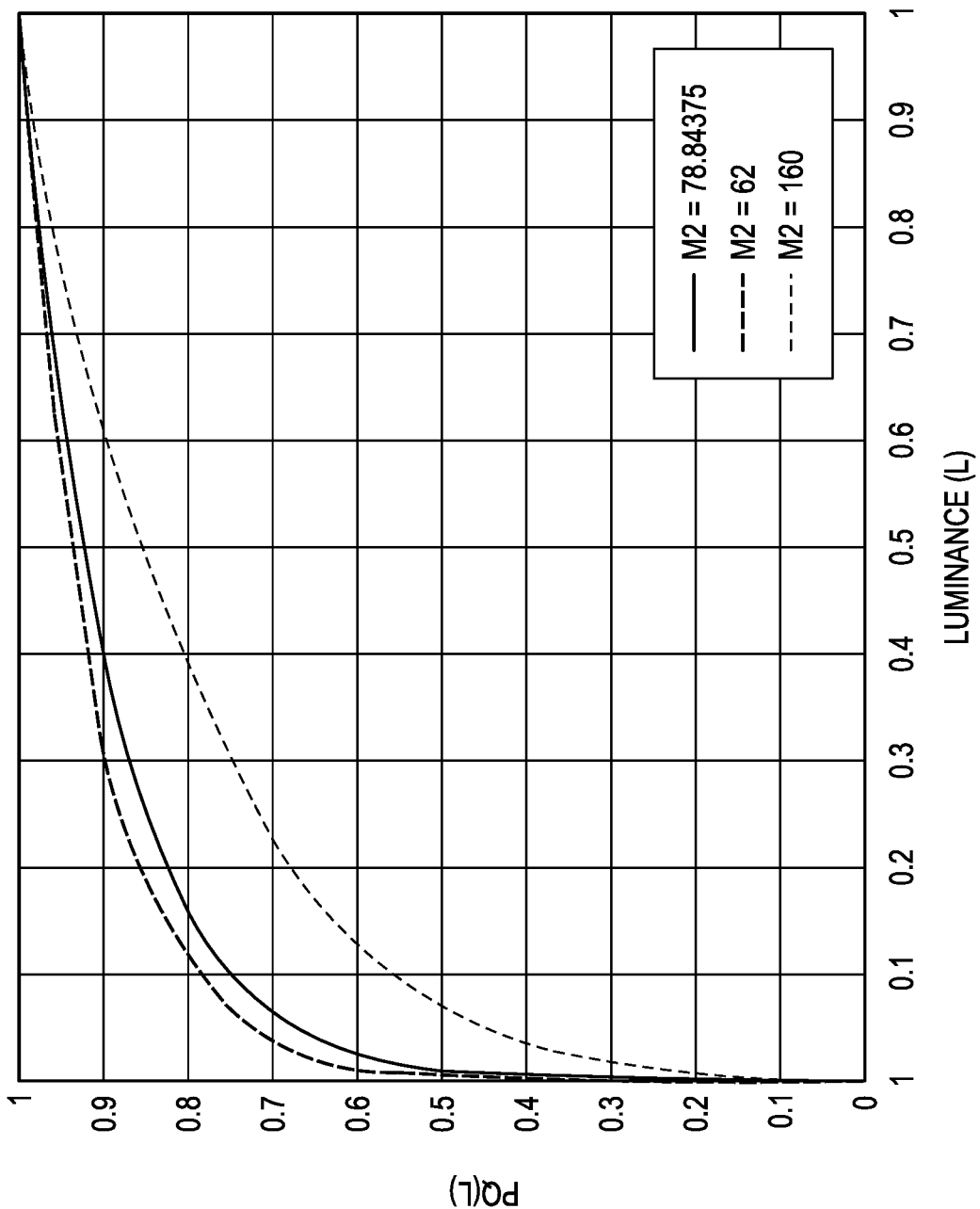
FIG. 7 depicts an exemplary plot of a perceptual quantizer curve for different values of an $m_2$ parameter in a perceptual quantizer function.

As shown in FIG. 7, tuning the value of $m_2$ can adjust the PQ curve for different luminance values. When $m_2$ is set to be larger than the 78.84375 value indicated above, such as when $m_2$ is set to 62, the PQ values can be increased throughout some or all of the curve. In contrast, when $m_2$ is set to be less than the 78.84375 value indicated above, such as when $m_2$ is set to 160, the PQ values can be decreased throughout some or all of the curve.

Figure 8:
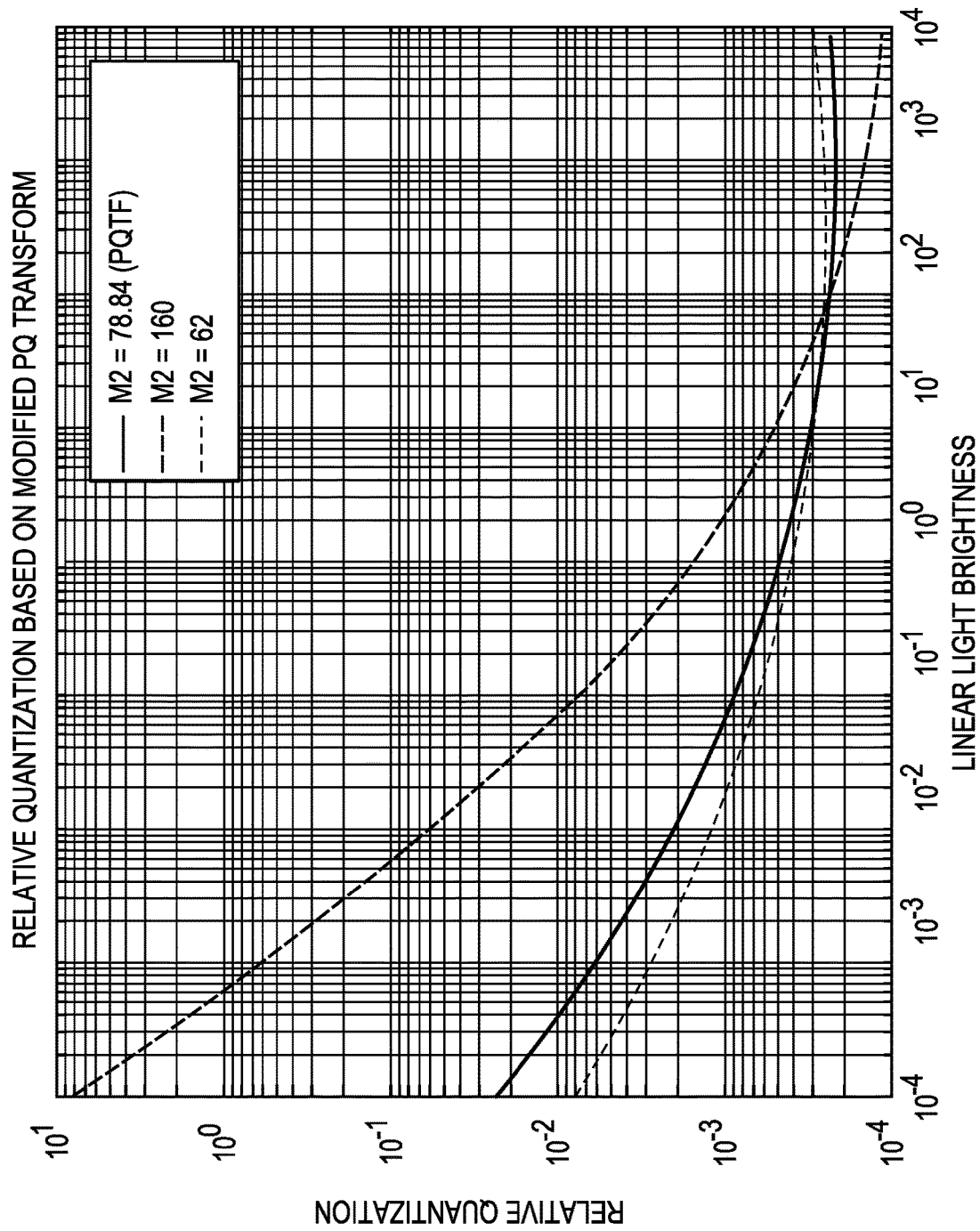
FIG. 8 depicts an exemplary plot of relative quantization step sizes for different values of an $m_2$ parameter in a perceptual quantizer function.

As shown in FIG. 8, when different $m_2$ values are used in the PQ transfer function and its relative quantization step size $\Lambda(I)$ is found, different values of $m_2$ can result in lower relative quantization step sizes $\Lambda(I)$ at different luminance values. By way of a non-limiting example, setting $m_2$ to 62 can provide lower relative quantization step sizes $\Lambda(I)$ at the low range of luminance values, thereby allocating more bits to those values when they are encoded. Similarly, setting $m_2$ to 160 can provide lower relative quantization step sizes $\Lambda(I)$ at the high range of luminance values, thereby allocating more bits to those values when they are encoded. As such, bits can be allocated differently and/or flexibly for different parts of the input video 104 depending on its content.

While the example above showed the effects of changing the $m_2$ parameter 112, such that the encoder 100 can inform the decoder 102 how to derive its inverse coding transfer function 238 by sending just the $m_2$ parameter 112 at each coding level, in other embodiments or situations the encoder 100 can additionally or alternately adjust any or all of the $m_1$, $c_1$, $c_2$, and $c_3$ parameters 112 during encoding to flexibly adjust the bit allocations based on the content of the input video 104. In such embodiments or situations, the encoder 100 can send the adjusted parameters 112 to the decoder 102. In some embodiments, the encoder 100 can use a predefined mapping function or lookup table to determine the value of $m_2$ or any other parameter 112 based on a distribution of pixel values. By way of a non-limiting example, the encoder 100 can find a value for $m_2$ based on an average intensity of pixel values.

As described above, the perceptual mapping operation 110 and reverse perceptual mapping operation 114 can change between different areas of the same picture, between pictures, or between sequences of pictures. In embodiments, encoding and decoding sub-portions of pictures and/or full pictures can depend on interrelated coding dependencies between the pictures, such as the relationships between I pictures and P or B pictures. As such, the encoder 100 can transmit one or more parameters 112 to the decoder 102 related to a perceptual mapping operation 110 at any desired coding level, such as a sub-picture level related to the coding of a sub-portion of a picture, a picture level related to coding a single picture, or a supra-picture related to coding a sequence of pictures. The decoder 102 can use the received parameters 112 to derive an appropriate reverse perceptual mapping operation 114 for each sub-portion of a picture, single picture, or sequence of pictures.

In some embodiments or situations, the encoder 100 can send parameters 112 to the decoder 102 on a supra-picture level. In these embodiments or situations, the reverse perceptual mapping operation 114 described by the parameters 112 can be applicable to all the pictures in a given sequence, such as a GOP. By way of a non-limiting example, the encoder 100 can statistically analyze the input values of all the pictures in a GOP, and use a coding transfer function 204 adapted to the range of values actually found within the pictures of that GOP. The encoder 100 can then send parameters 112 to the decoder 102 from which the decoder 102 can derive a corresponding inverse coding transfer function 238.

In some embodiments, the encoder 100 can send the parameters 112 to the decoder 102 on a supra-picture level using supplemental enhancement information (SEI) message. In other embodiments, the encoder 100 can send the parameters 112 to the decoder 102 on a supra-picture level using video usability information (VUI) or other information within a Sequence Parameter Set (SPS) associated with the GOP. In some embodiments, the decoder 102 can use the most recently received parameters 112 until new parameters 112 are received, at which point it can derive a new reverse perceptual mapping operation 114 from the newly received parameters 112. By way of a non-limiting example, parameters 112 can initially be set in an SPS, and then be updated on a per-GOP basis as the characteristics of the input video 104 changes.

In some embodiments or situations, the encoder 100 can send parameters 112 to the decoder 102 on a picture level. In these embodiments or situations, the reverse perceptual mapping operation 114 described by the parameters 112 can be applicable to full pictures. In some embodiments, the encoder 100 can send the parameters 112 to the decoder 102 on a picture level within a Picture Parameter Set (PPS) associated with a picture.

In some embodiments, such as when the pictures are P or B pictures that were encoded with reference to one or more reference pictures, the decoder 102 can receive and maintain parameters 112 for the reference pictures, as well as parameters 112 specific to individual temporally encoded pictures. As such, when the decoder 102 previously generated a reference picture with a reverse perceptual mapping operation 114 using a first set of parameters 112, and the decoder 102 receives a different set of parameters 112 for decoding a P or B picture encoded with reference to the reference picture, the decoder 102 can first reverse the previous reverse perceptual mapping operation 114 on the reference picture using the parameters 112 received for the reference picture. The decoder 102 can then perform a new reverse perceptual mapping operation 114 on the reference picture using the new set of parameters 112 received for the current picture, to re-map the reference picture according to the current picture's parameters 112. The decoder 102 can use the re-mapped reference picture when decoding the current picture. In some embodiments, the decoder 102 can re-map reference pictures according to new parameters 112 associated with a current picture if the new parameters 112 differ from old parameters 112 associated with the reference picture. In alternate embodiments, the decoder 102 can re-map reference pictures as described above if re-mapping is indicated in a flag or parameter received from the encoder 100.

In some embodiments or situations, the encoder 100 can send parameters 112 to the decoder 102 on a sub-picture level. In these embodiments or situations, the reverse perceptual mapping operation 114 described by the parameters 112 can be applicable to sub-pictures within a picture, such as processing windows, slices, macroblocks, or CTUs.

In some embodiments, the decoder 102 can receive and maintain parameters 112 for a current sub-picture and all reference pictures or sub-pictures, such as pixel blocks of size 4×4 or 8×8. As such, when decoding a sub-picture that was coded with reference to one or more reference pictures, the decoder 102 can first reverse previous reverse perceptual mapping operations 114 performed on reference pixels using parameters 112 previously received for the reference pixels. The decoder can then apply a new reverse perceptual mapping operation 114 on the reference pixels using new parameters 112 associated with the current sub-picture, to re-map the reference pixels according to the current sub-picture's parameters 112. The decoder 102 can use the re-mapped reference pixels when decoding the current sub-picture. In some embodiments, the decoder 102 can re-map reference pixels according to new parameters 112 associated with a current sub-picture if the new parameters 112 differ from old parameters 112 associated with the reference pixels. In alternate embodiments, the decoder 102 can re-map reference pixels as described above if re-mapping is indicated in a flag or parameter received from the encoder 100.

While the above description describes encoding and decoding processes in which a perceptual mapping operation 110 and reverse perceptual mapping operation 114 can decrease the likelihood of perceptible distortion and/or noise introduced by uniform quantization of values, in alternate embodiments a perceptual mapping operation 110 can be configured to reduce perceptible distortion and/or noise introduced by variable length quantization. By way of a non-limiting example, some implementations of AVC and HEVC use a predictive, variable length quantization scheme.

In these embodiments, the risk of introducing perceptible distortion and/or noise through variable length quantization can be reduced with a perceptual mapping operation 110 or quantization step that follows a Rate-Distortion-Optimization (RDO) scheme based on a perceptual distortion measure. By way of a non-limiting example, in the embodiment of FIG. 2, the encoder 100 can calculate a non-perceptual distortion metric, denoted as $D_{non\text{-}perceptual}$. By way of non-limiting examples, the non-perceptual distortion metric can be the mean squared error (MSE) or the error sum of squares (SSE). The encoder 100 can then calculate a perceptual distortion metric, denoted as $D_{perceptual}$, from the non-perceptual distortion metric. In some embodiments, the encoder 100 can use a lookup table that maps $D_{non\text{-}perceptual}$ values to D perceptual values. In other embodiments, the encoder 100 can use a perceptual distortion function based on characteristics of the human visual system, such as:

$$D_{perceptual} = f(D_{non\text{-}perceptual})$$

By way of a non-limiting example, the perceptual distortion function can be:

$$D_{perceptual} = w_{perceptual} \cdot D_{non\text{-}perceptual} + b_{perceptual}$$

In this example, $w_{perceptual}$ can be a weighting term and $b_{perceptual}$ can be an offset term, which can each be calculated for each color component of a pixel or group of pixels based on characteristics of the human visual system. By way of another non-limiting example, the perceptual distortion metric can be a weighted average of non-perceptual distortion metrics, such as MSE, across different color components.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method for generating High Dynamic Range (HDR) video data from an encoded video data stream that includes encoded Low Dynamic Range (LDR) video data set and does not include encoded High Dynamic Range (HDR) video data, the method comprising:
   decoding said encoded Low Dynamic Range (LDR) video data set from said encoded video data stream by a non-HDR decoding process of a video decoder;
   extracting, by said non-HDR decoding process of said video decoder, a metadata structure signaled for said video data set in said encoded video data stream comprising said encoded Low Dynamic Range (LDR) video data set;
   wherein said signaled metadata structure identifies a reshaping transfer function for video data that is signaled in an information message of said encoded video data stream;
   wherein said reshaping transfer function is related to the video data set signaled at a picture level in the encoded video data stream;
   wherein said reshaping transfer function is based upon a function including $f(L) = ((c1 + c2*L^{m1})/(1 + c3*L^{m1}))^{m2}$, where L is a luminance value, and c1, c2, c3, m1, m2 are parameters;
   wherein said decoding, by the non-HDR decoding process of said video decoder, the encoded Low Dynamic Range (LDR) video data set produces said decoded Low Dynamic Range (LDR) video data set without being modifed based upon said reshaping transfer function;
   generating HDR video data by applying the decoded Low Dynamic Range (LDR) video data set to said video data reshaping transfer function.

2. The method of claim 1 wherein said reshaping transfer function includes a look up table.

3. The method of claim 1 wherein said encoded video data stream is HEVC compliant.

4. The method of claim 1 wherein said encoded video data stream is AVC compliant.

5. The method of claim 1 wherein said reshaping transfer function for said video data is signaled in a supplemental enhancement information message included in a NAL unit of said encoded video data stream.

6. The method of claim 1 wherein said reshaping transfer function for said video data is signaled in a video usability information message included in a sequence parameter set of said encoded video data stream.

7. The method of claim 1 wherein said reshaping transfer function includes a perceptual quantizer function.

8. The method of claim 1 wherein said m1 and m2 are positive integer values.

9. The method of claim 4 wherein said m2 parameter is included within said metadata structure signaled for said video data set.

10. The method of claim 1 wherein said m2 parameter is included within said metadata structure signaled for said video data set that is adjusted based upon different luminance value ranges within a coding level of said video data stream.

11. The method of claim 1 wherein said HDR video data has a bit depth greater than 10.

12. The method of claim 1 wherein said video data is signaled in a supplemental enhancement information message of said encoded video data stream.

13. The method of claim 1 wherein said signaled metadata structure which identifies said reshaping transfer function is continued to be used for a plurality of frames of said video data stream until a different signaled metadata structure which identifies a modified reshaping transfer function based upon modified values of at least one of L, c1, c2, c3, m1, m2.

14. The method of claim 1 wherein said encoded Low Dynamic Range (LDR) video data set has a first color volume and said HDR video data has a second color volume.

15. The method of claim 1 wherein said m1 is a contrast parameter.

16. A method for generating High Dynamic Range (HDR) video data from an encoded video data stream that includes encoded Low Dynamic Range (LDR) video data set and does not include encoded High Dynamic Range (HDR) video data, the method comprising:
   decoding said encoded Low Dynamic Range (LDR) video data set from said encoded video data stream by a non-HDR decoding process of a video decoder;
   extracting, by said non-HDR decoding process of said video decoder, a metadata structure signaled for said video data set in said encoded video data stream comprising said encoded Low Dynamic Range (LDR) video data set;

wherein said signaled metadata structure identifies a reshaping transfer function for video data that is signaled in an information message of said encoded video data stream;

wherein said reshaping transfer function is signaled based upon different values of said metadata structure for different segments of said video, each of which including a plurality of frames, in the encoded video data stream;

wherein said decoding, by the non-HDR decoding process of said video decoder, the encoded Low Dynamic Range (LDR) video data set produces said decoded Low Dynamic Range (LDR) video data set without bring modified based upon said reshaping transfer function;

generating HDR video data by applying the decoded Low Dynamic Range (LDR) video data set to said video data reshaping transfer function based upon said different values of said metadata structure for said different segments of said video.

17. A method for generating High Dynamic Range (HDR) video data from an encoded video data stream that includes encoded Low Dynamic Range (LDR) video data set and does not include encoded High Dynamic Range (HDR) video data, the method comprising:

decoding said encoded Low Dynamic Range (LDR) video data set from said encoded video data stream by a non-HDR decoding process of a video decoding process;

extracting, by said non-HDR decoding process of said video decoding process, a metadata structure signaled for said video data set in said encoded video data stream comprising said encoded Low Dynamic Range (LDR) video data set;

wherein said signaled metadata structure characterizes a reshaping transfer function for video data that is signaled in a message of said encoded video data stream;

wherein said reshaping transfer function is signaled using a different value of said metadata structure for different segments of said video, each of which including a plurality of frames, in the encoded video data stream;

wherein said decoding, by the non-HDR decoding process of said video decoding process, the encoded Low Dynamic Range (LDR) video data set produces said decoded Low Dynamic Range (LDR) video data set without being modified based upon said reshaping transfer function;

generating HDR video data by applying the decoded Low Dynamic Range (LDR) video data set to said video data reshaping transfer function based upon said different value of said metadata structure for said different segments of said video.

* * * * *